US012375520B2

(12) United States Patent
Kyadige et al.

(10) Patent No.: US 12,375,520 B2
(45) Date of Patent: Jul. 29, 2025

(54) TECHNIQUES FOR DETECTING LIVING-OFF-THE-LAND BINARY ATTACKS

(71) Applicant: Sophos Limited, Abingdon (GB)

(72) Inventors: Adarsh Dinesh Kyadige, Thornton, CO (US); Ben Uri Gelman, Reston, VA (US); Konstantin Berlin, Potomac, MD (US)

(73) Assignee: Sophos Limited, Abingdon (GB)

( * ) Notice: Subject to any disclaimer, the term of this patent is extended or adjusted under 35 U.S.C. 154(b) by 280 days.

(21) Appl. No.: 18/144,585

(22) Filed: May 8, 2023

(65) Prior Publication Data

US 2024/0056475 A1     Feb. 15, 2024

Related U.S. Application Data

(60) Provisional application No. 63/396,484, filed on Aug. 9, 2022.

(51) Int. Cl.
*H04L 9/40*     (2022.01)
*G06N 20/00*     (2019.01)

(52) U.S. Cl.
CPC ......... *H04L 63/1441* (2013.01); *G06N 20/00* (2019.01); *H04L 63/1416* (2013.01); *H04L 63/1425* (2013.01); *H04L 63/20* (2013.01)

(58) Field of Classification Search
CPC ............. H04L 63/1441; H04L 63/1416; H04L 63/1425; H04L 63/20; H04L 41/16; G06N 20/00; G06N 3/042; G06N 3/044; G06N 3/0464; G06N 3/048; G06N 3/09;

(Continued)

(56) References Cited

U.S. PATENT DOCUMENTS 10,419,469 B1 *   9/2019   Singh ..................... H04L 43/06
10,635,813 B2     4/2020   Saxe et al.
10,841,333 B2   11/2020   Levy
(Continued)

OTHER PUBLICATIONS

Bucevschi, Alexandru-Gabriel, et al., "Preventing File-less Attacks with Machine Learning Techniques," IEEE, 2019 21$^{st}$ International Symposium on Symbolic and Numeric Algorithms for Scientific computing (SYNASC), Sep. 4, 2019, pp. 248-252.

(Continued)

*Primary Examiner* — Michael Won
(74) *Attorney, Agent, or Firm* — Cesari and McKenna, LLP; James A. Blanchette (57) ABSTRACT

In example embodiments, techniques are provided to detect LOLBin attacks using a trained machine learning model that classifies command lines as benign or malicious. The machine learning model may be trained using a dataset of command line data that describes executed binary executable files, sourced from the log of events of compute instances. The dataset may be sampled using an approximate content-based logarithmic sampling algorithm (e.g., an algorithm that employs logarithmic sampling based on a locality sensitive hash, for example, a MinHash). The dataset may be labeled and featurized. The featurized labeled dataset may be used to train the machine learning model, which is then deployed to detect LOLBin attacks on a compute instance. In response to detection of a LOLBin attack, a remedial action may be performed on the compute instance.

13 Claims, 9 Drawing Sheets

(58) Field of Classification Search
CPC .... H04N 21/251; H04N 21/466; H04N 21/45; H04N 21/4662; G06F 7/023
See application file for complete search history.

(56) References Cited

U.S. PATENT DOCUMENTS

| | | | |
|---|---|---|---|
| 11,003,774 B2 | 5/2021 | Saxe et al. | |
| 11,200,511 B1* | 12/2021 | London | G06N 7/01 |
| 11,204,998 B2* | 12/2021 | Lancioni | G06N 5/04 |
| 11,979,418 B2* | 5/2024 | Simon | H04L 63/145 |
| 12,032,687 B2* | 7/2024 | Stokes, III | G06F 21/566 |
| 2014/0344195 A1* | 11/2014 | Drew | G06F 16/35 |
| | | | 706/12 |
| 2016/0071017 A1* | 3/2016 | Adjaoute | G06Q 20/4016 |
| | | | 706/52 |
| 2020/0304528 A1 | 9/2020 | Ackerman et al. | |
| 2020/0364338 A1 | 11/2020 | Ducau et al. | |
| 2021/0141897 A1* | 5/2021 | Seifert | G06F 21/565 |
| 2021/0326361 A1* | 10/2021 | Du | G06F 16/909 |
| 2022/0100857 A1* | 3/2022 | Filar | G06N 5/01 |
| 2023/0224311 A1* | 7/2023 | Meshi | H04L 41/0609 |
| | | | 726/22 |

OTHER PUBLICATIONS

"Notification of Transmittal of the International Search Report and the Written Opinion of the International Searching Authority, or the Declaration," International Filing Date: Jul. 31, 2023, International Application No. PCT/GB2023/052021, Date of Mailing: Oct. 16, 2023, pp. 1-19.

Ongun, Talha, et al., "Living-Off-The-Land Command Detection Using Active Learning," arXiv, arXiv:2111.15039v1 [cs.CR], ACM, RAID'21, Oct. 6-8, 2021, San Sebastian, Spain, arxlv.org, Cornell University Library, 201 Online Library Cornell Uiversity Ithica, NY, 14853, Nov. 30, 2021, pp. 1-14.

Sudhakar and Sushil Kumar, "An Emerging Threat Fileless Malware: A Survey and Research Challenges," Springer, Springer Open, Cybersecurity, vol. 3, No. 1, Jan. 14, 2020, pp. 1-12.

Brandt, Andrew, et al., "Email-delivered MoDi RAT Attack Pastes PowerShell Commands: Fileless Attack Scripts an Interaction with the Clipboard to Evade Detection," Sophos X-OPS, Sophos Ltd., Retrieved from the Internet: <https://news.sophos.com/en-us/2020/09/24/email-delivered-modi-rat-attack-pastes-powershell-commands/>, Sep. 24, 2020, pp. 1-13.

Gallagher, Sean, "Two Flavors of Tor2Mine Miner Dig Deep into Networks with PowerShell, VBScript," Sophos Ltd., Retrieved from the Internet: <https://news.sophos.com/en-us/2021/12/02/two-flavors-of-tor2mine-miner-dig-deep-into-networks-with-powershell-vbscript/>, Dec. 2, 2021, pp. 1-20.

Nataraj, Rajesh, "New Lemon Duck Variants Exploiting Microsoft Exchange Server," Sophos X-OPS, Sophos X-OPS, Sophos Ltd., Retrieved from the Internet: <https://news.sophos.com/en-us/2021/05/07/new-lemon-duck-variants-exploiting-microsoft-exchange-server/>, May 7, 2021, pp. 1-16.

Taoufiq, Salma, "ELI10: Hunting for Malicious URLs with Character-level Embeddings and Convolutions", Sophos AI, Sophos Ltd., May 11, 2021, pp. 1-6.

Wueest, Candid, et al., "Internet Security Threat Report ISTR: Living Off the Land and Fileless Attach Techniques," An ISTR Special Report, Symantec, Symantec Corporation, Jul. 2017, pp. 1-30.

* cited by examiner

TECHNIQUES FOR DETECTING LIVING-OFF-THE-LAND BINARY ATTACKS

CROSS-REFERENCE TO RELATED APPLICATIONS

The present application claims the benefit of U.S. Provisional Patent Application Ser. No. 63/396,484, which was filed on Aug. 9, 2022 by Adarsh Dinesh Kyadige et al., for "Using Machine Learning to Identify and Respond to Living-Off-The-Land Attacks", which is hereby incorporated by reference in its entirety.

BACKGROUND

Technical Field

The present application relates generally to protection against malicious attacks caused by malware, viruses, spyware, intrusions, and the like, and more specifically, to detecting living-off-the-land binary (LOLBin) attacks.

Background Information

Typically, there are large numbers of binary executable files present on endpoints, network devices, virtual machines, and other types of compute instances. These binary executable files are typically preinstalled as part of the operating system or are installed by a user as part of legitimate software. While in and of themselves they are non-malicious, they can be repurposed or exploited as part of a malicious attack, for example, to perform tasks such as payload deliver or remote code execution. The malicious use of an existing non-malicious binary executable files is commonly referred to as a "LOLBin attack."

LOLBin attacks can be damaging. Binary executable files often have broad permissions and authority to make system-wide changes, grant permissions, modify running processes, etc. that can be exploited and misused to cause significant harm. Likewise, binary executable files may have remote access and code execution capabilities that can enable entry and exploitation of systems by attackers.

Further, LOLBin attacks can be difficult to detect. It can be difficult to distinguish malicious use of a binary executable file from legitimate use of the same file. Often, the only artifact of a LOLBin attack is a record of the command line(s) used to execute the binary executable file(s). However, there are a variety of techniques attackers may use to obfuscate the arguments used in such command lines (e.g., encoding the input in base 64, building code to be executed on the fly from strings, etc.) to make a malicious execution difficult to distinguish from a benign execution of the command line.

Accordingly, there is a need for improved techniques for detecting LOLBin attacks.

SUMMARY

In various example embodiments, techniques are provided to detect LOLBin attacks using a trained machine learning model (e.g., a convolutional neural network model) that classifies command lines as benign or malicious. The machine learning model may be trained using a dataset of command line data that describes executed binary executable files, sourced from the log of events of compute instances (e.g., endpoints, network devices, virtual machines, etc.). The dataset may be sampled using an approximate content-based logarithmic sampling algorithm (e.g., an algorithm that employs logarithmic sampling based on a locality sensitive hash, for example, a MinHash), which samples command lines efficiently without introducing bias (e.g., without under-representing or over-representing frequently used commands, that correctly determines which commands are semantically unique, etc.). The dataset may be labeled (e.g., directly, indirectly, by applying a pre-trained machine learning model to predict pseudo-labels, etc.) and featurized (e.g., by extracting character-level features or using other featurization schemes). The featurized labeled dataset may be used to train the machine learning model, which is then deployed to detect LOLBin attacks on a compute instance (e.g., endpoint, network device, virtual machine, etc.). In response to detection of a LOLBin attack, a remedial action may be performed on the compute instance.

In one example embodiment, a method for detecting LOLBin attacks may be performed by receiving a dataset of command line data sourced from one or more compute instances, wherein the dataset includes a plurality of command lines that execute one or more binary executable files. A content-based logarithmic sampling algorithm may be used to create a sampled dataset from the dataset. The sampled dataset may be labeled, and the sampled dataset may be featurized, to produce a labeled featurized dataset. A machine learning model of a threat management facility executing on one or more computing devices may be trained using the labeled featurized dataset. The trained machine learning model may be deployed to detect LOLBin attacks on a compute instance.

In another example embodiment, a method for detecting LOLBin attacks may be performed by collecting a prediction dataset of command line data for a compute instance, wherein the prediction dataset includes at least one command line that executes a binary executable file. The prediction dataset may be featurized to produce a featurized prediction dataset. A threat management facility executing on the compute instance or on one or more cloud-based servers of a cloud platform may use a trained machine learning model to classify the featurized prediction dataset into benign command line data or malicious command line data. The threat management facility may detect a LOLBin attack in response to a classification indicating the featurized prediction dataset includes malicious command line data. The threat management facility may further perform a remedial action on the compute instance in response to the detected LOLBin attack.

In yet another example embodiment, a system is provided for detecting LOLBin attacks. The system may include one or more security agents adapted to be executed on compute instances, the security agents configured to collect command line data that includes command lines that execute binary executable files. The system also may include a threat management facility adapted to be executed at least in part on one or more computing devices. The threat management facility may be configured to receive a dataset of command line data sourced from the one or more compute instances, wherein the dataset includes a plurality of command lines that execute binary executable files, use a locality sensitive hashing algorithm to create a sampled dataset from the dataset, label the sampled dataset and featurize the sampled dataset to produce a labeled featurized dataset, train a machine learning model using the labeled featurized dataset, and deploy the trained machine learning model to a compute instance to detect LOLBin attacks.

It should be understood that a wide variety of additional features and alternative embodiments may be implemented other than those discussed in this Summary. This Summary is intended simply as a brief introduction to the reader for the further description that follows and does not indicate or imply that the examples mentioned herein cover all aspects of the disclosure or are necessary or essential aspects of the disclosure.

BRIEF DESCRIPTION OF THE DRAWINGS

The description below refers to the accompanying drawings of example embodiments, of which:

FIG. 1 is a block diagram of an example threat management system in which a threat management facility may provide protection against malicious attacks, including attacks performed by malware, viruses, spyware, intrusions, and the like;

DETAILED DESCRIPTION

The following detailed description describes example embodiments. Any documents mentioned should be considered to be incorporated by reference in their entirety. Any references to items in the singular should be understood to include items in the plural, and vice versa, unless explicitly stated otherwise or otherwise clear from the context. Grammatical conjunctions are generally intended to express any and all disjunctive and conjunctive combinations of conjoined clauses, sentences, words, and the like, unless otherwise stated or clear from the context. For example, the term "or" should generally be understood to mean "and/or."

Any recitation of ranges of values are not intended to be limiting, are provided as examples only, and are not intended to constitute a limitation on the scope of the described embodiments. Further, any recitation of ranges should be interpreted as referring individually to any and all values falling within the range, unless otherwise indicated, and each separate value within such a range should be treated as if it were individually recited. Terms of approximation such as "about," "approximately," "substantially" or the like, should be construed as referring to an allowance for deviation that is appreciated by one of ordinary skill in the art to still permit satisfactory operation for the corresponding use, function, purpose, or the like. No language in the description should be construed as indicating an element is a necessary or essential aspect of the disclosure. Further, terms such as "first," "second," "top," "bottom," "up," "down," and the like should be considered to be words of convenience and do not preclude differing orderings or orientations.

Figure 1:
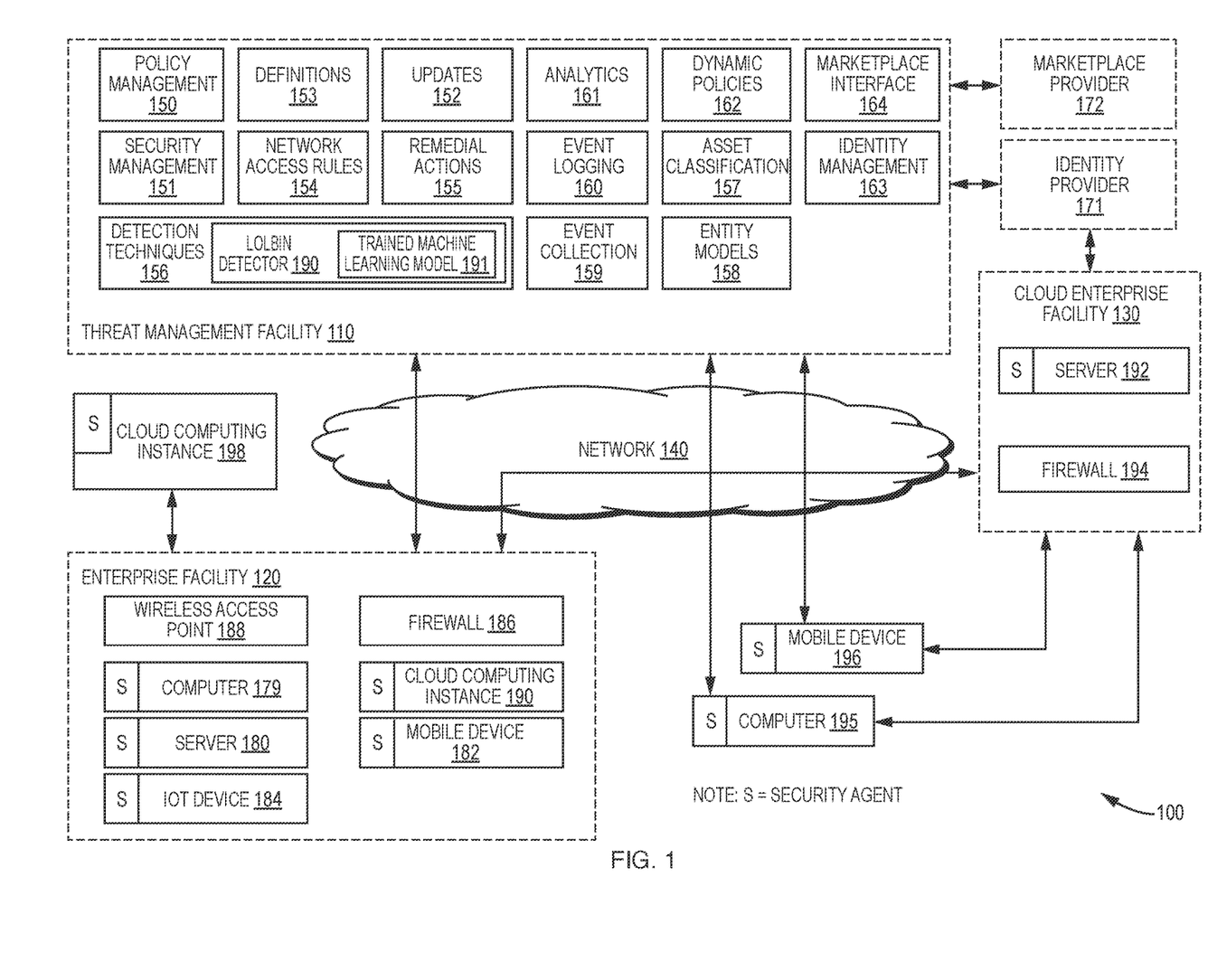

FIG. 1 is a block diagram of an example threat management system 100 in which a threat management facility 110 may provide protection against malicious attacks, including attacks performed by malware, viruses, spyware, intrusions, and the like. One subset of such malicious attacks may be LoLBin attacks. The threat management facility 110 may communicate with, coordinate, and control operation of, security functionality of compute instances and networks within an enterprise facility 120, cloud enterprise facility 130, or external to such facilities 120, 130. As used herein, the term "compute instance" refers to a hardware device (e.g., an endpoint, network device, or sub-component thereof) that can run software code, or a virtual machine (e.g., a cloud computing instance) executing on a hardware device (e.g., a cloud-based or local server) that can run software code. In this context, being "within" a facility 120, 130 refers to being on the local area network (LAN) of the facility 120, 130 (e.g., inside the gateway) or being more generally associated with the facility 120, 130 (e.g., outside the gateway but nonetheless managed by, or in communication with, devices of the facility). An overall goal of the threat management facility 110 may be to intelligently use the breadth and depth of information that is available to it via security agents and other connected software to provide protection from a variety of threats to the compute instances and networks within the enterprise facility 120, cloud enterprise facility 130, and external to such facilities 120, 130.

Looking to the threat management facility 110 in more detail, the facility 110 may include a number of sub-facilities (in this context, typically processes or daemons that perform discrete functions) such as a policy management facility 150, security management facility 151, update facility 152, definitions facility 153, network access rules facility 154, remedial actions facility 155, detection techniques facility 156, asset classification facility 157, entity model facility 158, event collection facility 159, event logging facility 160, analytics facility 161, dynamic policies facility 162, identity management facility 163, marketplace interface facility 164, as well as other facilities. The threat management facility 110 and its sub-facilities 150-164 may be executed, in whole or in part, on compute instances in a single or different locations. For example, some portion of the threat management facility 110 or its sub-facilities 150-164 may be executed on a cloud platform that includes cloud-based servers or other cloud-based computing devices, while other portions may be executed on endpoints, network devices or virtual machines of an enterprise facility 120 or cloud enterprise facility 130, or external to such facilities 120, 130. In the latter case, the threat management facility 110 or its sub-facilities 150-164 may be integrated into a security agent S that is executed by a compute instance (or in some cases physical hardware of a compute instance) of an enterprise facility 120 or cloud enterprise facility 130, or external to such facilities 120, 130. Accordingly, while FIG. 1 shows the threat management facility 110 and its sub-facilities 150-164 as separate from the endpoints, network devices and virtual machines of an enterprise facility 120 or cloud enterprise facility 130, or endpoints, network devices and virtual machines external to such facilities 120, 130, it should be understood that such separation is merely to permit visual representation.

Each facility 150-164 may provide a respective function to collectively provide protection from threats. The policy management facility 150 may manages rules or policies, for example, access permissions for networks, applications, compute instances, users, data, and the like. The security management facility 151 may provide malicious code protection, email security and control, web security and control, network access control, host intrusion prevention, reputation filtering, as well as other functions. The update management facility 153 may provide control over when updates are performed, for example, receiving updates from a provider, and distributing the updates to compute instances and networks. The network access rules facility 154 may provide access restriction to applications, networks, endpoints, data, users, etc. under direction of network access policies from the policy management facility 150 or other sources. The remedial actions facility 155 may take measures to address a threat or policy violation detected by another facility, such as collecting additional data to enable further response, terminating or modifying an ongoing process or interaction, sending a warning to a user or administrator, downloading a remediation data file with commands, definitions, instructions, or the like to execute, executing a remediation program or application, quarantining an entity or device, blocking access to resources, etc. The detection techniques facility 156 may provide particular threat detection techniques used by the security management facility 151 and other facilities. The detection techniques may broadly include signature-based threat detection techniques, behavioral threat detection techniques, machine learning models, and other techniques for detecting threats. As described in more detail below, the detection techniques facility 156 may include among its functionality a LoLBin attack detector 190 that employs a trained machine learning model 191 to detect LoLBin attacks.

The asset classification facility 157 may provide an asset discovery service to determine assets present in the enterprise facility 120, cloud enterprise facility 130, or external to such facilities 120, 130. As used herein, the term "asset" refers to data, a device, or other component that supports information-related activities. Assets are typically organized in an asset stack, where a first level asset is physical hardware. A compute instance may be, or may be implemented on, a first level asset.

The entity models facility 158 may determine the events that are generated by assets, for example, from process/usage information providing by an operating system, from activity information from containers, etc. The event collection facility 159 may identify the occurrence of particular events based on information from sensors that monitor assets, for example, sensors that monitor streaming data through network devices, monitor activity of compute instances, monitor stored files/data on compute instances, etc. The event logging facility 160 may store (e.g., locally and/or in cloud-based storage) events collected by the event classification facility 157 so that they can be accessed and analyzed. The analytics facility 161 may make inferences and observations about the events, as part of policies enforced by the security management facility 151 or other facilities, that may be stored by the event logging facility 160. The dynamic policies facility 162 may generate policies dynamically based on observations and inferences made by the analytics facility 161 that may be provided to the policy management facility 150 and enforced by the security management facility 151.

The identity management facility 163 may operate in conjunction with a remote identity provider 171 to confirm identity of a user as well as provide or receive other information about users that may be useful to protect against threats. Among other functionality, the identity management facility 163 may communicate hygiene, or security risk information, to the identity provider 171. The identity provider 171 may determine a risk score for a user based on the events, observations, and inferences about that user and compute instances associated with the user, and take steps to address any potential risk. The marketplace interface facility 164 may operate in conjunction with a marketplace provider 172 (e.g., a physical security event provider, a human resources system provider, a fraud detection system provider, etc.) to provide additional functionality or capabilities to the threat management facility 110. The interface facility 164 may provide notifications of events to the marketplace provider 172, which in turn may analyze the events and return inferences that may be used by the analytics facility 161 and/or the security management facility 151.

Looking to the enterprise facility 120 in more detail, it should be understood that the enterprise facility 120 includes a collection of networked computer-based infrastructure. For example, the enterprise facility 120 may be a corporate, commercial, organizational, educational or governmental computer network. Likewise, as home networks are becoming more complex, the enterprise facility 120 may alternatively be a home network or a network that covers a group of homes. The enterprise facility 120 may include a number of compute instances, including endpoints, network devices and virtual machines. The endpoints and network devices may be distributed amongst a plurality of physical premises, such as buildings, and located in one or in a number of geographical locations. Each may take a variety of different forms. For example, endpoints may be individual computers 179, servers 180, mobile devices 182, Internet appliances or Internet-of-Things (IOT) devices 184 or other physical devices that connect to and exchange information with a network. The network devices may include firewalls 186, wireless access points 188, gateways, bridges or other physical devices that are required for communication and interaction between hardware on a network. The virtual machines may include cloud computing instances 190 or other computing environments created by abstracting resources from a physical device. The virtual machines may be executed on hardware distributed amongst a plurality of physical premises, for example, local servers, remote servers, cloud-based servers of a cloud platform, etc. In general, it should be understood that that the compute instances shown in FIG. 1 of the enterprise facility 120 are merely examples, and that the compute instances of an enterprise facility 120 may include a wide variety of types of endpoints, network devices and virtual machines.

Looking to the cloud enterprise facility 130 in more detail, it should be understood that the cloud enterprise facility 120 includes a collection of cloud-based infrastructure. The cloud enterprise facility 120 may provide software as a service (SaaS), platform as a service (PaaS), Infrastructure as a Service (IaaS) or other cloud computing functions to compute instances and networks within the enterprise facility 120 or external to such facility. The cloud enterprise facility 120 may include a number of compute instances, including endpoints, network devices and virtual machines. For example, the cloud enterprise facility 130 may include servers 192, firewalls 194, as well as other physical devices. Likewise, the cloud enterprise facility 130 may include a number of cloud computing instances 190 or other computing environments. It should be understood that the compute instances shown in FIG. 1 inside the cloud enterprise facility 130 are merely examples and that the compute instances of a cloud enterprise facility 130 may include a wide variety of types of endpoints, network devices and virtual machines.

Looking to compute instances and networks external to the enterprise facility 120 and cloud enterprise facility 130 in more detail, it should be understood that the compute instances may similarly include a number of endpoints, network devices, virtual machines, and the like. For example, the external compute instances may include individual computers 195, mobile devices 196 and cloud computing instances 198 as well as other physical devices or virtual machines. The external compute instances may use network connectivity not directly associated with or controlled by the enterprise facility 120 or the cloud enterprise facility 130, for example, a mobile network, a public cloud network, a wireless network of a hotel or coffee shop, etc. The external compute instances may be protected from threats by the threat management facility 110 even though they are outside the enterprise facility 120 or the cloud enterprise facility 130.

The compute instances of the enterprise facility 120, cloud enterprise facility 130, or external to such facilities 120, 130 may communicate with each other, cloud based portions of the threat management facility 110, and other cloud based platforms (not shown) that provide SaaS or other services independent of the facilities 120, 130, with unprotected servers (not shown) that host websites, and the like, via a network 140, such as the Internet, or other public or private network.

Figure 2:
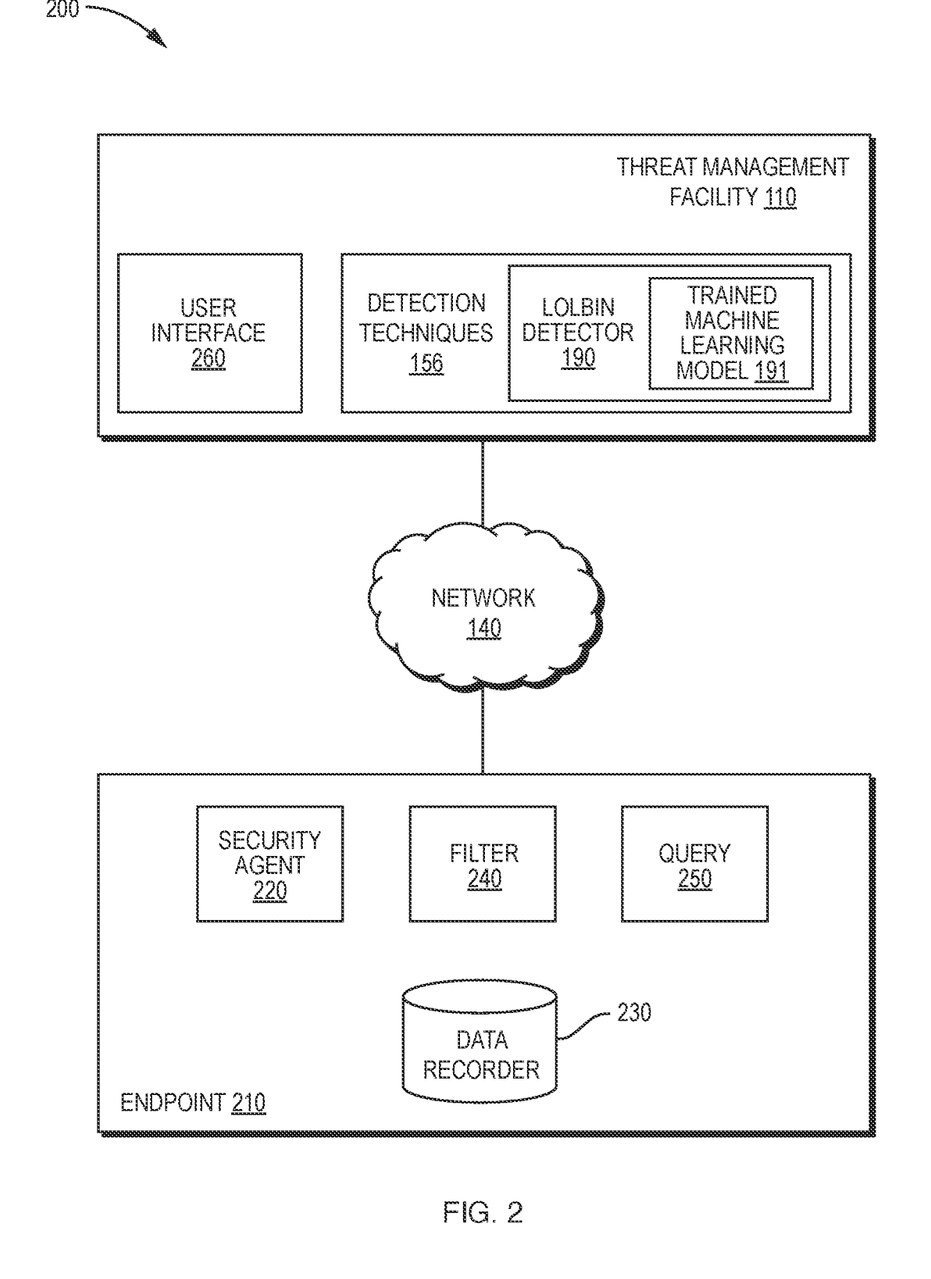
FIG. 2 is a block diagram of a portion of an example threat management system focusing on interactions of a compute instance, in this example an endpoint, with the threat management facility.

FIG. 2 is a block diagram of a portion of an example threat management system 200 focusing on interactions of a compute instance, in this example an endpoint 210, with the threat management facility 110. It should be understood that the interactions shown in FIG. 2 may be similarly applicable to other types of compute instances, such as network devices or virtual machines. The endpoint 210 may include a memory/storage device and a processor that maintain and execute, respectively, software for a security agent 220, as well as a data recorder 230, filter process 240, query process 250, and/or other software. The security agent 220 may locally support threat management on the endpoint 210, such as by monitoring for malicious activity, managing security components on the endpoint, maintaining policy compliance, performing scans, apply signature-based, behavioral and/or machine learning-based threat detection techniques, or performing other tasks as part of providing protection against malicious attacks.

The security agent 220 on the endpoint 210 may communicate via the network 140 (e.g., the Internet) with portions of the remote threat management facility 110 that are executed on a cloud platform that includes cloud-based servers or other cloud-based computing devices. Likewise, as discussed above, portions of the threat management facility 110 may be integrated into the security agent 220 on the endpoint. Accordingly, while sub-facilities of the threat management facility 110 are shown separately in FIG. 2, it should be remembered that may instead be provided in whole or in part locally on the endpoint 210.

The data recorder 230, filter process 240, and query process 250 may be portions of the security agent 220, or separate software processes. The data recorder 230 may operate to log executed events occurring on, or related to, the endpoint 210, or directed from the endpoint 210. The events may include executed command lines, including command lines that execute binary executable files, such that a portion of the log of events is a record of executed command lines. The events may also include other types of information, including file manipulations, software installations, and the like, as well as requests for content (e.g., from Uniform Resource Locators (URLs) or other remote resources) issued by the endpoint 210.

The filter process 240 may operate to manage a flow of information from the data recorder 230 to the threat management facility 110, and its sub-facilities 150-164. The log of events produced by the data recorder 230 may include records of events of various types and describe such events with a high level of detail. To improve efficiency (e.g., to conserve network resources, reduce computing resource consumption, etc.), the filter process 230 may report a filtered event stream that contains information most relevant to a particular threat detection task. In some cases, the filter process 240 may additionally group records of various types to provide causal connections. Examples of types of records that may be grouped may include records that reference a same or similar commands, records that describe events that occurred within a same or similar time frame, records related to a same or similar file manipulation, software installation, or requests for content, etc.

Operation of the filter process 240 may be adapted based on a current security status of the endpoint 210, a group of endpoints, an enterprise network, and the like. The level of filtering and reporting may also be adapted based on currently available network resources and/or computing resources, or other factors.

The query process 250 may operate to service requests of the threat management facility 110, and its sub-facilities 150-164 to obtain records from the log of events produced by the data recorder 230, for example, to obtain records about events of specific types (e.g., events involving the execution of binary executable files), activity for specific computing objects, events over a specific time frame, etc. The query process 250 may also provide the entire log of events in response to a service request from the threat management facility 110, or more specifically one of its sub-facilities 150-164.

As discussed above, the threat management facility 110 may provide protection against a variety of types of malicious attacks, a sub-set of which may include LoLBin attacks. To such end, the detection techniques facility 156 may include a LoLBin attack detector 190 that employs a trained machine learning model 191 to detect LoLBin attacks. The threat management facility 110 may include a user interface 260, which may take the form of a local graphical user interface, a website, or another type of interface. The user interface 260 may provide functionality for configuration, administration, audit, and the like. Among other functionality, the user interface 260 may include screens for configuring and administering operation of the LoLBin attack detector 190 of the detection techniques facility 156.

In various embodiments, the LoLBin attack detector 190 of the detection techniques facility 156 may detect LOLBin attacks using a trained machine learning model (e.g., a convolutional neural network model) 191 that classifies command lines as benign or malicious. The machine learning model may be trained using a dataset of command line data that describes executed binary executable files, sourced from the log of events of compute instances. The dataset may be sampled using an approximate content-based logarithmic sampling algorithm (e.g., an algorithm that employs logarithmic sampling based on a locality sensitive hash, for example, a MinHash, of command lines), which samples command lines efficiently without introducing bias (e.g., without under-representing or over-representing frequently used commands, correctly determines which commands are semantically unique, etc.). The dataset may be labeled (e.g., directly, indirectly, by applying a pre-trained machine learning model to predict pseudo-labels, etc.) and featurized (e.g., by extracting character-level features or using other featurization schemes). The featurized labeled dataset may be used to train the machine learning model 191, which is then deployed to the LoLBin attack detector 190 of the detection techniques facility 156 of the threat management facility 110 to detect LOLBin attacks on a compute instance. In response to detection of a LOLBin attack, the remedial actions facility 155 of the threat management facility 110 may perform a remedial action on the compute instance.

Figure 3:
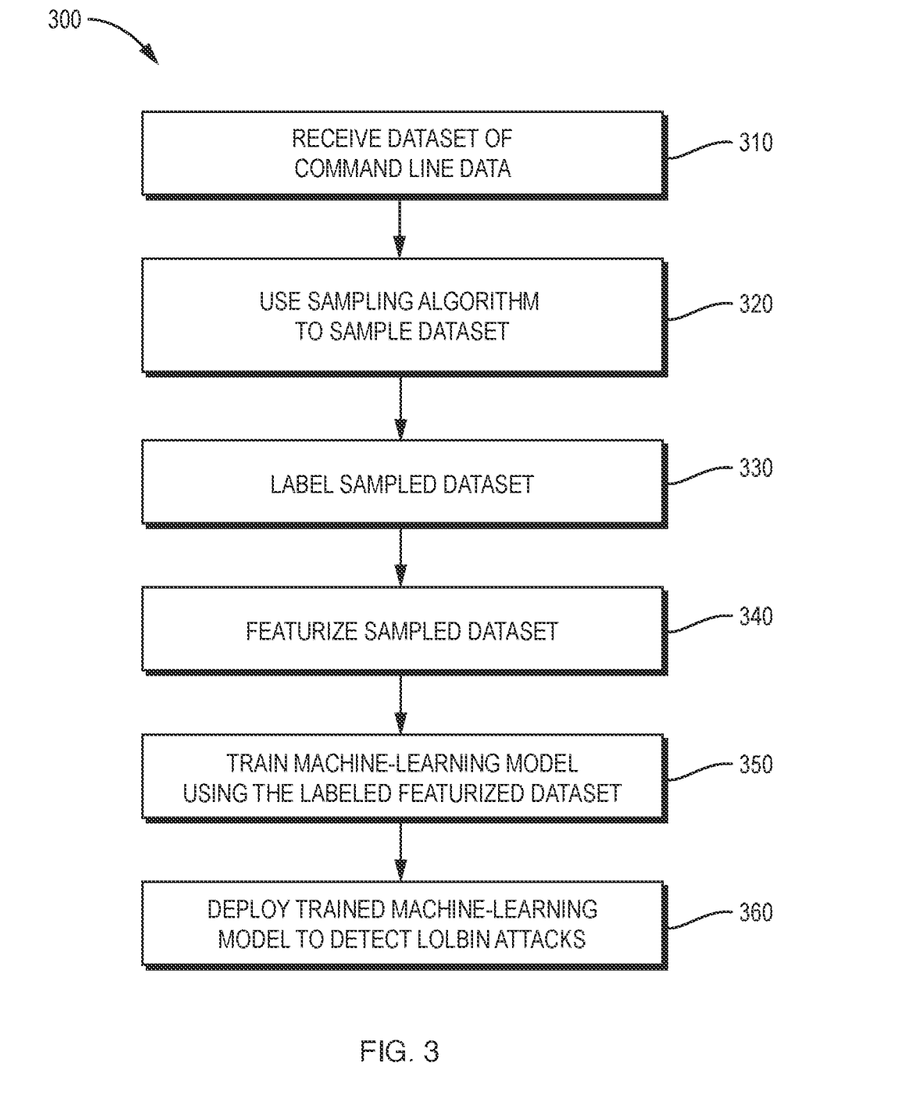
FIG. 3 is a flow diagram of an example sequence of steps that may be executed by a threat management facility and/or other software to train a machine learning model to detect LOLBin attacks.

FIG. 3 is a flow diagram of an example sequence of steps 300 that may be executed by the threat management facility 110 and/or other software to train a machine learning model to detect LOLBin attacks. In one implementation, the steps 300 of the flow diagram are executed by one or more of the sub-facilities 150-164 illustrated in FIGS. 1-2, and are discussed by way of reference thereto.

At step 310, the threat management facility 110 and/or other software receives a dataset of command line data sourced from compute instances (e.g., endpoints, network devices or virtual machines), wherein the dataset includes a plurality of command lines that execute one or more binary executable files. The command line data may include large numbers of individual command lines (e.g., millions or billions of command lines) that have been executed on various ones of a large number of compute instances over a given period of time (e.g., a day, a week, etc.).

Figure 4:
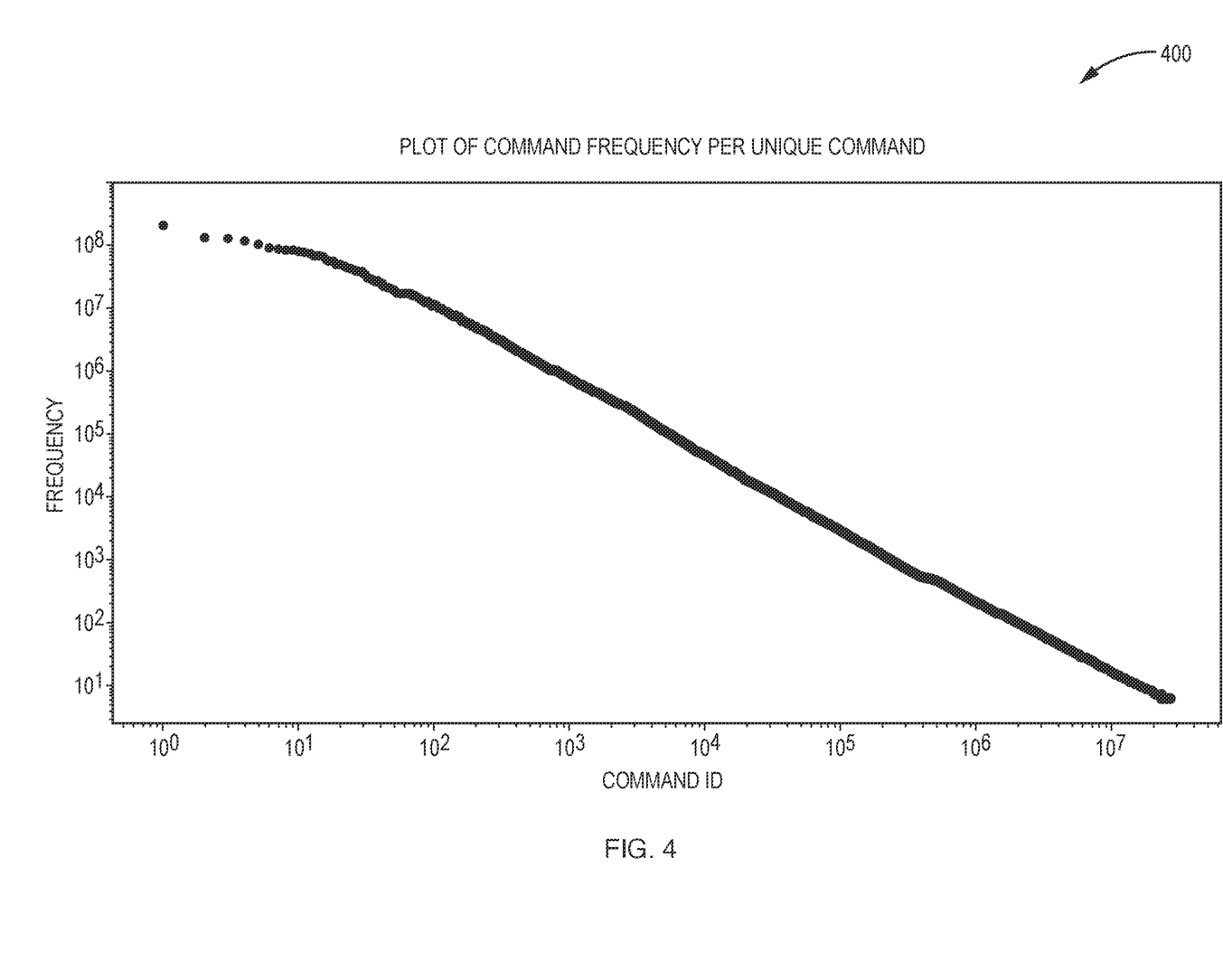
FIG. 4 is a plot of frequency of occurrence of example command lines that may be received.

FIG. 4 is a plot of frequency of occurrence of example command lines that may be received as part of step 310 of FIG. 3. As can be seen, unique command lines may occur according to a power law distribution, with a few command lines occurring very frequently and a large number of unique command lines occurring just a few times, creating a long tail. This sort of distribution may present problems in creating a training dataset for machine learning, as it is difficult to sample command lines efficiently without introducing bias. If one were to simply sample unique command lines, then frequency information may be lost and the dataset may under-represent frequently seen commands. If one were to simply sample randomly, frequent commands may be overrepresented and much of the long tail may be lost. Further, simply determining whether command lines are unique may be challenging. For example, command lines often include file-paths or other arguments, which may be listed in various orders, and which may have values that can be specified with different levels of precision. As such, if a simple Distinct operation or string comparison were employed, two semantically identical, or at least semantically similar command lines, may be incorrectly considered unique, even though they effectively produce the same (or similar) result.

At step 320, the threat management facility 110 and/or other software, uses a sampling algorithm to sample the dataset and create therefrom a sampled dataset. In one implementation, the threat management facility 110 and/or other software uses an approximate content-based logarithmic sampling algorithm, for example, an algorithm that employs logarithmic sampling based on a locality sensitive hash of command lines, to sample the dataset and create therefrom a sampled dataset. In one embodiment the locality sensitive hash is a min-wise independent permutations locality sensitive hashing scheme (MinHash). A locality sensitive hash (e.g., MinHash) of a command line results in a set of multiple values (as sometimes referred to as "components") that represent the command line. Two semantically similar command lines typically will have a similar set of values, such that the set of values may be used to determine whether the two commands are truly unique.

Figure 5:
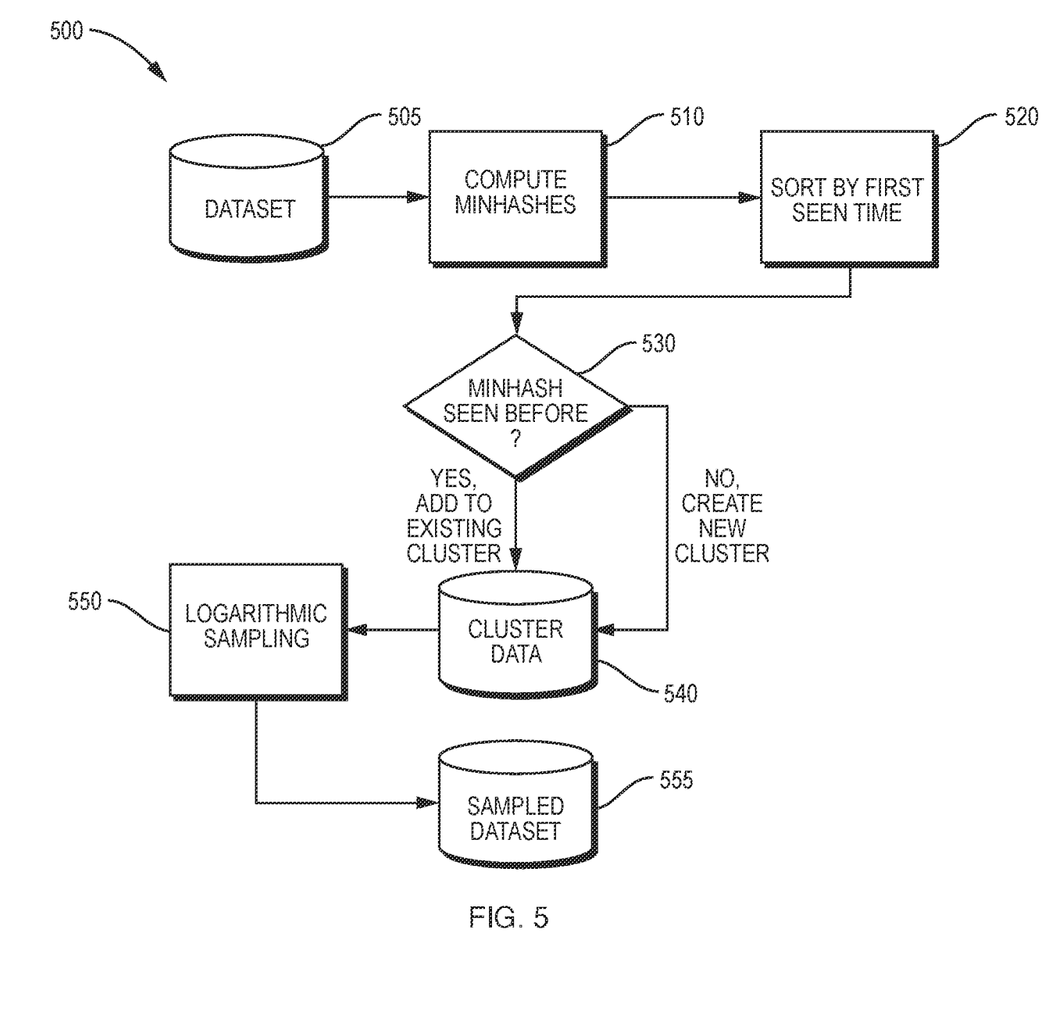
FIG. 5 is a flow diagram of a first example implementation in which a locality sensitive hash (e.g., MinHash) of command lines is computed, clustered, and then logarithmically sampled.

A locality sensitive hash (e.g., MinHash) of the command lines and logarithmic sampling may be implemented in multiple different ways. For example, FIG. 5 is a flow diagram of a first example implementation of step 310 of FIG. 3 in which a locality sensitive hash (e.g., MinHash) of the command lines is computed, clustered, and then logarithmically sampled. In one implementation, the steps 500 of the flow diagram are executed by one or more of the sub-facilities 150-164 illustrated in FIGS. 1-2, and are discussed by way of reference thereto.

At step 510, a locality sensitive hashing algorithm (e.g., MinHash algorithm) is employed to compute a hash (e.g., MinHash) of each of the command lines in a dataset 505, each hash including in a set of multiple values (e.g., MinHash values) that represent the command line. Thereafter, the command lines may be assigned to one or more clusters based on a corresponding command line's hash. This may be performed by creating clusters as new (e.g., MinHash values) are first seen.

For example, at step 530, the hash (e.g., MinHash) of each command line is sorted by time to create a time-sorted list of hashes. This time-sorted list is examined sequentially, and, at step 540, a determination is made whether a hash (e.g., a MinHash) has been seen before. If not, a new cluster is created for the hash (e.g., MinHash) and the corresponding command line is assigned to the cluster in cluster data 550. If so, the corresponding command line is added to an existing cluster for the hash (e.g., MinHash) in cluster data 550. At step 560, a logarithmic sampling algorithm is applied to each cluster. The resulting logarithmically sampled command lines from the clusters are assembled together to create a sampled dataset 555.

While this first example implementation may be effective, it may have limited scalability due to the sequential nature of the computation. Searching all the existing hashes (e.g., MinHashes) before deciding a new cluster is needed may be difficult to execute in parallel or in a distributed manner. Such issues may be addressed by creating a sampled dataset 555 by logarithmic sampling directly from the hashes (e.g., MinHashes) without creating intermediate clusters.

Figure 6:
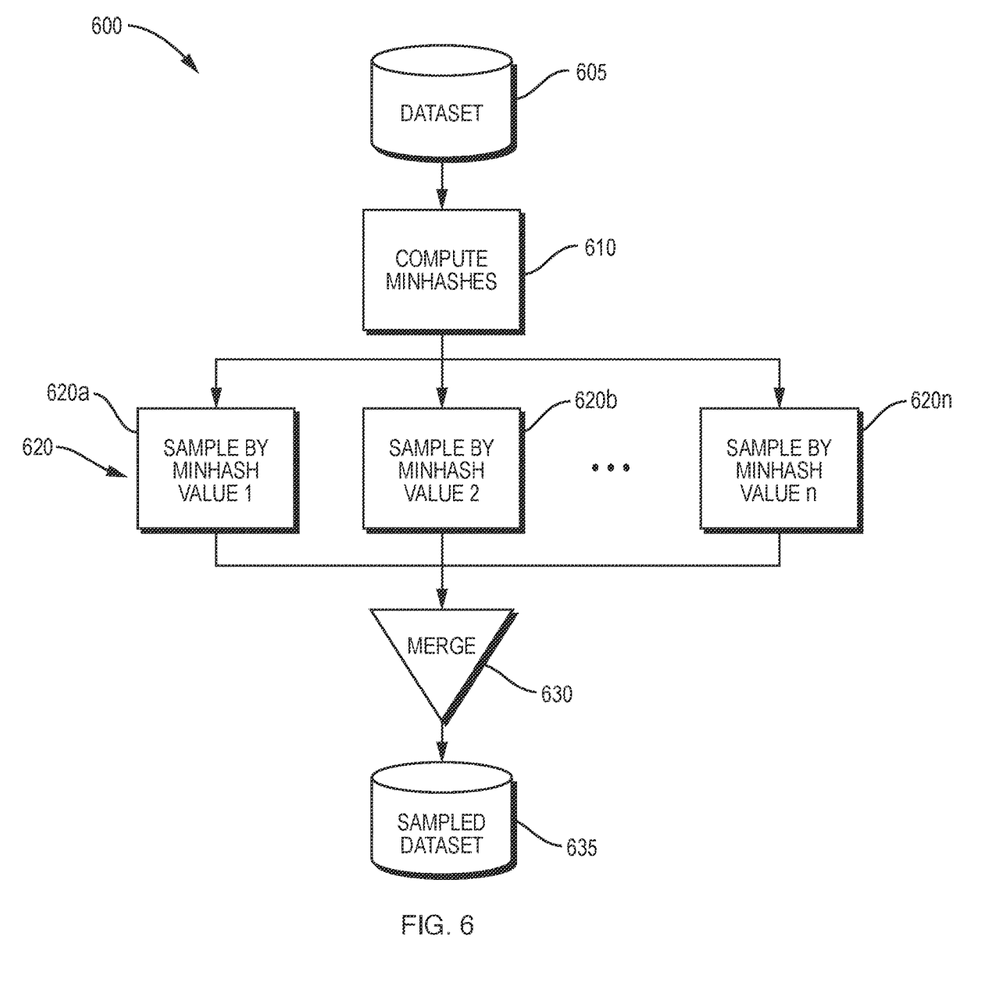
FIG. 6 is a flow diagram of a second example implementation in which a locality sensitive hash (e.g., MinHash) of command lines is computed and logarithmic sampling is performed directly from the hashes.

FIG. 6 is a flow diagram 600 of a second example implementation of step 310 of FIG. 3 in which a locality sensitive hash (e.g., MinHash) of the command lines is computed and logarithmic sampling is performed directly from the hashes. In one implementation, the steps 600 of the flow diagram are executed by one or more of the sub-facilities 150-164 illustrated in FIGS. 1-2, and are discussed by way of reference thereto.

At step 610, a locality sensitive hashing algorithm (e.g., MinHash algorithm) is employed to compute a hash (e.g., MinHash) of each of the command lines in a dataset 605, each hash including in a set of multiple values (e.g., MinHash values) that represent the command line. Rather than clustering, the command lines having each value of the set of multiple values are placed into separate buckets and each bucket is logarithmically sampled.

For example, at step 620, for each value of the set of multiple values (e.g., MinHash values such as 1, 2, . . . n)

produced by the locality sensitive hashing algorithm (e.g., MinHash algorithm), the command lines having such value are placed into a bucket corresponding to such value (e.g., a bucket for "1", a bucket for "2", . . . a bucket for "n"), and a logarithmic sampling algorithm is applied to each bucket to logarithmically sample from the command lines having that value (e.g., sample by MinHash value 1 at sub-step 620*a*, sample by MinHash value 2 at sub-step 620*b* . . . , sample by MinHash value n at sub-step 620*n*). This may produce a number of value samples (e.g., n value samples) that each correspond to a different value (e.g., MinHash value). At step 630, the samples for each value are merged (e.g., by taking their union) to create a sampled dataset 635. Such an approach may be easily scaled and readily distributed (e.g., with logarithmic sampling of different buckets being performed by different computing devices, threads, etc.)

Returning to FIG. 3, at step 330 the threat management facility 110 and/or other software labels the sampled dataset. Labeling may assign to each command line in the sampled dataset a label that indicates whether the given command line is a benign command line or malicious command line. Labels may be generated using indirect labeling in which labels are inferred from other data sources, direct labeling in which labels are specifically assigned (e.g., by an expert), a combination of both, and/or other techniques. Indirect labeling may be based on command lines determined to be malicious, by functionality of the threat management facility 110 and its sub-facilities 150-164, for example command lines that are part of a chain of malicious activity in root cause analysis reports, command lines found in behavior traces of malicious files, command lines detected by threat analyst rules, command lines containing known malicious URLs, command lines that download known malicious files, and the like. Direct labeling may be based on command lines being displayed in a user interface of the threat management facility 110, and assigned therein (e.g., by an expert) a label. For both indirect and direct labeling there may be greater amounts of information indicating malicious command lines than benign command lines. In some implementations, unlabeled command lines of the sampled dataset may be automatically assumed to be benign command lines, unless specifically labeled to be malicious.

It should be understood that in various embodiments a wide variety of other labeling techniques may alternatively, or additionally, be used. For example, labeling may be performed using crowd sourced rules (e.g., Sigma rules) available from open repositories that operate upon command lines to detect malicious activity. Likewise, labeling may be performed using pseudo-labeling techniques. The sampled dataset may be applied to a pre-trained machine learning model (e.g., a pre-trained OpenAI CodeX model trained on natural language data) to predict one or more pseudo-labels that indicate whether a given command line is a benign command line or a malicious command line. The labeled dataset may then be produced from the sampled dataset and the pseudo-labels.

At step 340, the threat management facility 110 and/or other software featurizes the sampled dataset to produce a labeled featurized dataset. A variety of different feature representations may be used. In one implementation, the feature representation may be a character-level feature representation of the command line.

Figure 7:
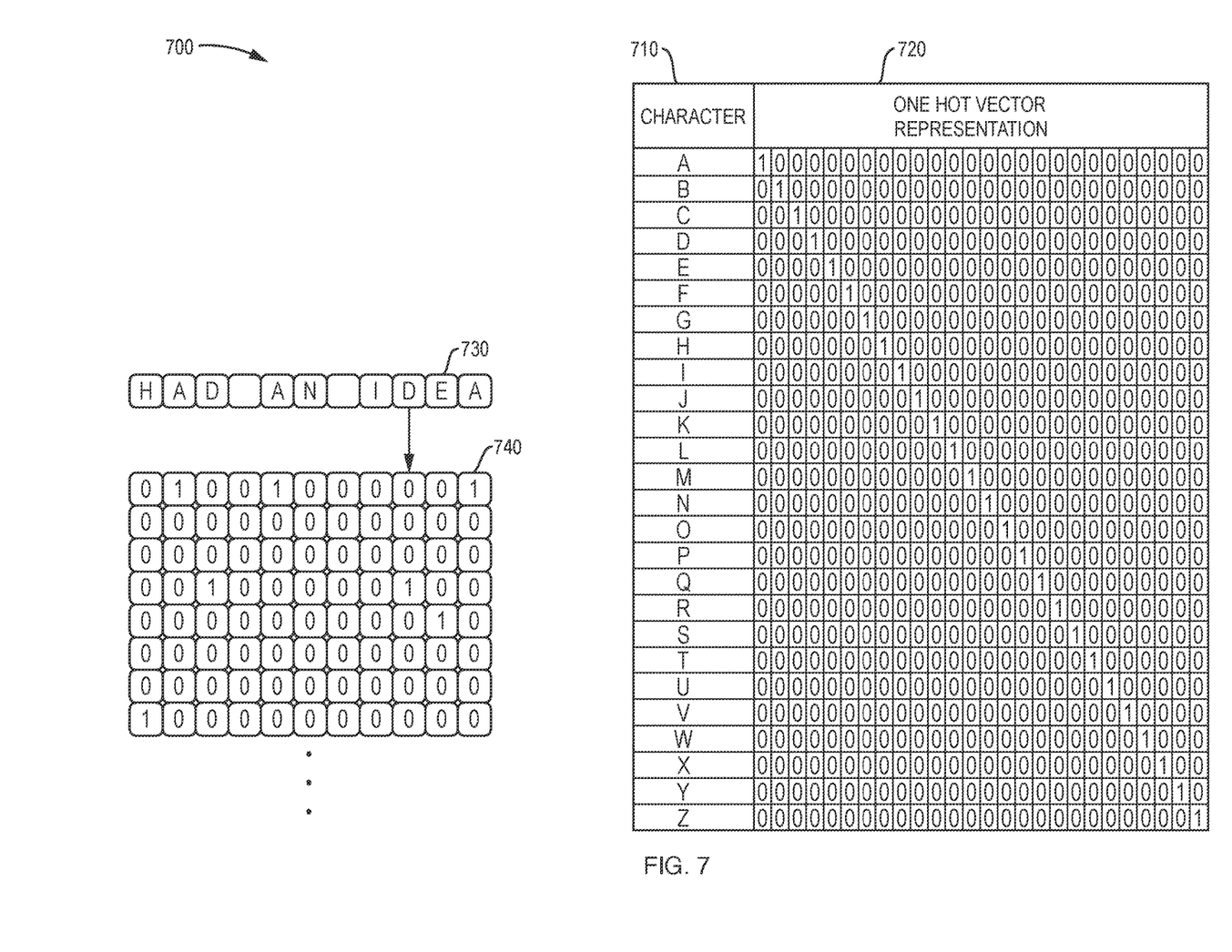
FIG. 7 is a diagram illustrating an example character-level feature representation that may be used in featurizing a dataset.

FIG. 7 is a diagram 700 illustrating an example character-level feature representation that may be used in featurizing the dataset. Each printable character 710 may be assigned a representation (e.g., a one-hot vector representation) 720 according to a predetermined mapping. While only upper case characters are shown in FIG. 7, it should be understood that the predetermined mapping may similarly cover lower case characters, numbers, special characters, and the like. By applying such predetermined mapping to characters 730, a character-level feature representation (e.g., a 2D one-hot array) 740 may be generated.

At step 350, the threat management facility 110 and/or other software trains a machine learning model using the labeled featurized dataset. In one embodiment, the machine learning model is a convolutional neural network (CNN) model. However, it should be understood that a wide variety of machine learning architectures may alternatively, or additionally, be utilized, for example, graph neural network architectures, recurrent neural network architectures, capsule neural network architectures, etc.

Figure 8:
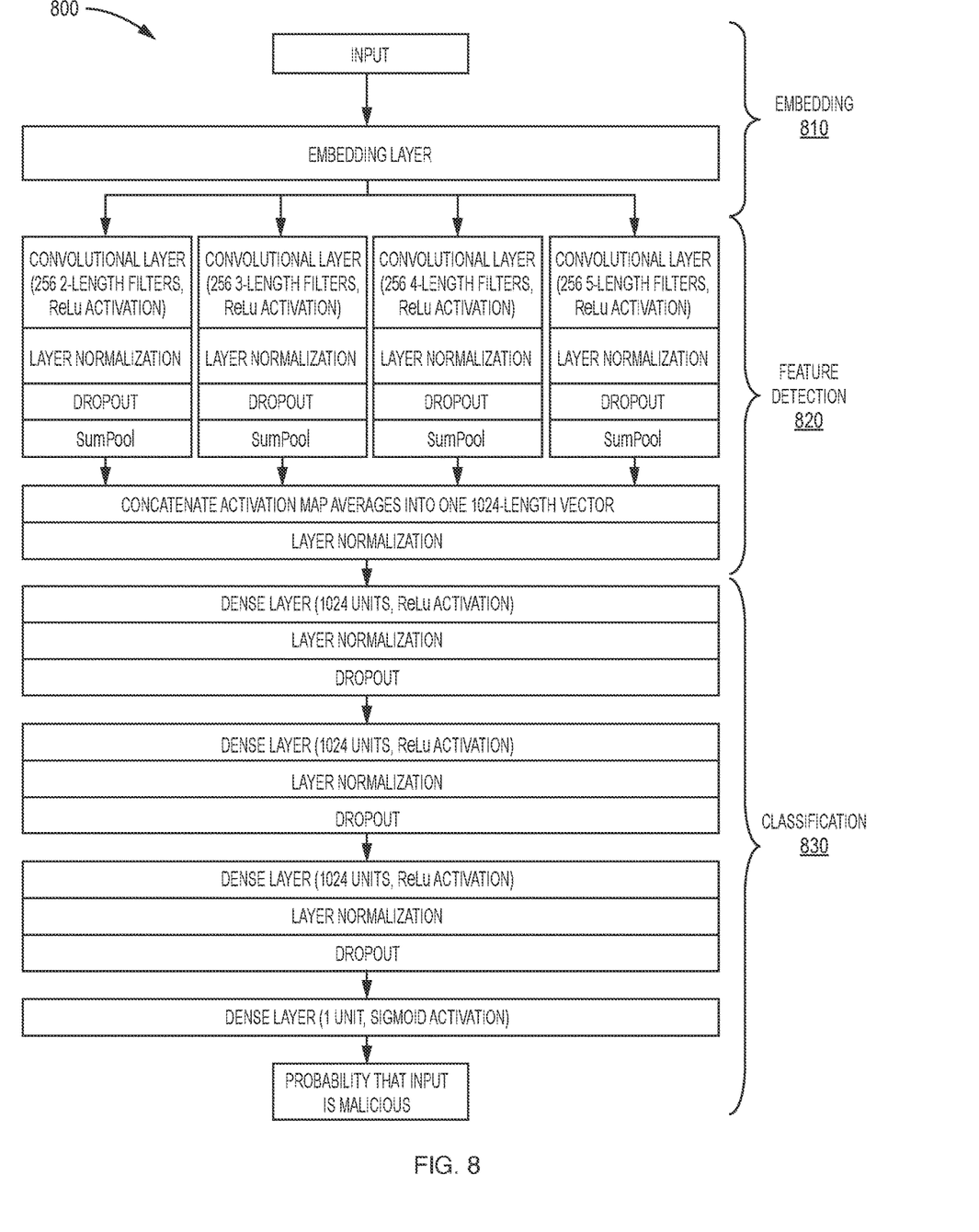
FIG. 8 is a block diagram of an example CNN model architecture.

FIG. 8 is a block diagram of an example CNN model architecture 800 that may be trained as part of step 350 of FIG. 3. Command lines of the labeled featurized dataset may be provided as input to an embedding stage 810 that may include an embedding layer. The embedding layer turns the existing representation of each character into an embedding having an embedding dimension (e.g., a list of number m values long). With training, the embedding layer learns to represent characters having similar roles with similar embeddings.

The embeddings are provided to a feature detection stage 820 that may include a number (e.g., 4) convolution layers as well as concatenation logic and layer normalization logic. Each convolution layer may include a number of (e.g., 256) convolutional filters of a given size (e.g., 2, 3, 4, 5) that are slide over a matrix of the embeddings, performing a dot product between the filter's parameters and the region covered. A rectified linear activation function (ReLu) activation function may be used by each convolution layer. The result is an activation map (also referred to as a "feature map") that summarizes what the parts of the embedding matrix indicate relative to the classification task. The concatenation logic may concatenate the activation maps into one vector (e.g., a 1024 bit vector) that provides a concise representation of results. The normalization logic may perform batch normalization, such that subsequent layers may receive input in a uniform way.

The normalized vectors representing the activation maps are provided to a classification stage 830 that may include a number of dense layers (also referred to as "fully-connected layers"). The initial dense layers (e.g., the first three dense layers) may include a number of neurons (e.g., 1024 neurons) that are connected to each other and the output of the proceeding layer. These initial dense layers (e.g., the first 3 dense layers) seek to find patterns in the output from the previous layer to advance the classification task. The final dense layers (e.g., the fourth dense layer) may include a single neuron that performs a final classification that predicts the probability the command line is a malicious command line. A first activation function (e.g., a ReLu activation function) may be used with the initial dense layers (e.g., the first three dense layers) while a second, different activation function (e.g., a sigmoid activation function) may be used with the final dense layers (e.g., the fourth dense layer).

Learning in all the stages 810-830 of the CNN model architecture 800 may be achieved using a binary cross entropy loss function. During training, performance may be evaluated by comparing the predicted probability that a given command line is malicious against a label indicating whether the given command line is actually malicious and calculating binary cross-entropy, which indicates how close, or far off the model was. An optimization algorithm (e.g., an Adam optimizer) may assist the model in learning from mistakes and decreasing loss.

At step 360, the threat management facility 110 and/or other software deploys the trained machine learning model 191 to detect LOLBin attacks on a compute instance. For example, the trained machine learning model 191 may be incorporated into the LoLBin attack detector 190 of the detection techniques facility 156 that is executed at least in part in a security agent on the compute instance, or executed at least in part on one or more cloud-based servers of a cloud platform.

Figure 9:
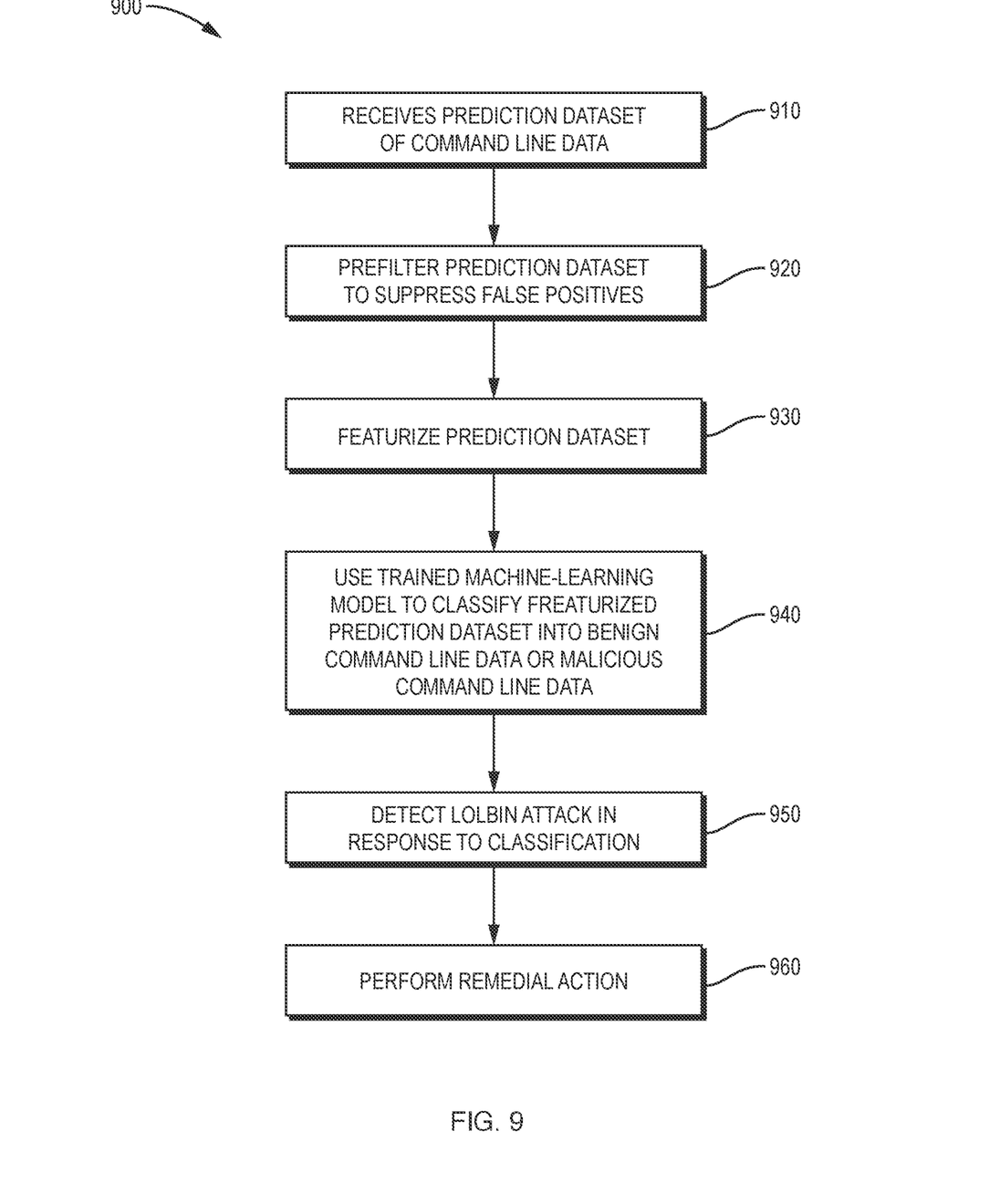
FIG. 9 is a flow diagram of an example sequence of steps that may be executed by a threat management facility and/or other software to use a trained machine learning model to detect LOLBin attacks and trigger remedial actions.

After the trained machine learning model 191 has been deployed (e.g., incorporated into the LoLBin attack detector 190) it may be used to detect LOLBin attacks and trigger remedial actions. FIG. 9 is a flow diagram of an example sequence of steps 900 that may be executed by the threat management facility 110 and/or other software to use a trained machine learning model 191 to detect LOLBin attacks and trigger remedial actions. In one implementation, the steps 900 of the flow diagram are executed by one or more of the sub-facilities 150-164 illustrated in FIGS. 1-2, and are discussed by way of reference thereto.

At step 910, the threat management facility 110 receives a prediction dataset of command line data for a compute instance (e.g., endpoints, network devices or virtual machines), wherein the prediction dataset includes at least one command line that executes a binary executable file.

At step 920, the threat management facility 110 prefilters the prediction dataset to suppress false positives. The prefiltering may effectively impose guardrails around the trained machine learning model 191, such that it is exposed only to a subset of command line data (e.g., a subset that is already determined likely to include malicious line data). In one embodiment, a set of regular expression-based rules (regex rules) for detecting malicious attacks is applied to classify each command line in the prediction dataset into a corresponding severity class (e.g., a malicious, suspicious, benign, etc. severity class). The prediction dataset is then filtered to pass only those command lines having an elevated severity class (e.g., malicious or suspicious severity class). In a second embodiment, a set of crowd-sourced signatures that identify malicious events are applied to classify each command line in the prediction dataset into a corresponding severity class. Again, the prediction dataset is filtered to pass only those command lines having an elevated severity class. By eliminating command lines that are highly likely to be benign, the command lines that can possibly be misclassified to produce a false positive are reduced.

At step 930, the threat management facility 110 featurizes the prediction dataset by converting command lines to a featurized prediction dataset. Similar to step 340 of FIG. 3, a variety different feature representations may be used, including a character-level feature representation.

At step 940, the threat management facility 110, or more specifically the LoLBin attack detector 190 of the detection techniques facility 156 thereof, uses the trained machine learning model 191 to classify the featurized prediction dataset into benign command line data or malicious command line data. For each command line, the trained machine learning model 191 may produce a probability the command line is malicious. A command line with a probability above a given threshold may be considered malicious command line data, and below a given threshold may be considered benign command line data.

At step 950, the threat management facility 110, or more specifically the security management facility 156 thereof, detects a LOLBin attack in response to a classification indicating the featurized prediction dataset includes malicious command line data.

At step 960, the threat management facility 110, or more specifically the remedial actions facility 156 thereof, performs a remedial action on the compute instance in response to the detected LOLBin attack. The remedial action may include one or more of collecting additional data to enable further response, terminating or modifying an ongoing process or interaction, sending a warning to a user or administrator, downloading a remediation data file with commands, definitions, instructions, or the like to execute, executing a remediation program or application, quarantining an entity or device, blocking access to resources, and the like.

In conclusion, the above description describes various techniques to detect LOLBin attacks using a trained machine learning model (e.g., a convolutional neural network model). The techniques may provide a number of advantages over prior techniques. For example, the techniques may overcome challenges in distinguishing malicious use of a binary executable file from legitimate use of the same file, even in situations where an attacker has attempted to obfuscate the usage (e.g., attempted to obfuscate the arguments). Further, the techniques may be executed efficiently on a variety of types of compute instances, for example, utilizing moderate amounts of processing or memory resources thereof. In such manner, the techniques may improve the functioning of such compute instances, in comparison to other possible techniques which may less efficiently utilize resources.

It should be understood that a wide variety of adaptations and modifications may be made to the techniques to suit various implementations and environments. While it may be discussed above that aspects of the techniques can be implemented by specific software executing on specific hardware, it should be understood that the techniques may also be implemented by different software, different hardware or various different combinations thereof that are suitable for a particular environment. Software may include instructions in a high-level programming language (e.g., C++) or low-level programming language (e.g., assembly language, hardware description language, database programming language, etc.) that may be stored, and compiled or interpreted to run on hardware. For example, instructions may be stored on a non-transitory computing-device readable medium and when executed on one or more processors may be operable to perform the above techniques.

While it may be discussed above that certain portions of the techniques may be arranged or distributed in certain ways, it should be understood a wide variety of other arrangements are also possible, and that portions of the techniques may be distributed across software, hardware or combinations thereof in a wide variety of other manners. For example, functionality may be distributed across any of the devices or systems described above, or all functionality may be integrated into a single device or system. Likewise, means for performing any steps described above may include any of the hardware and/or software described above. All such permutations and combinations are intended to fall within the scope of the present disclosure.

It should be understood that the ordering of any method steps discussed above may be changed to suit various applications or requirements. Absent an explicit indication to the contrary, the order of steps described above may be modified such that a subsequent step occurs before a preceding step, or in parallel to such step.

Above all, it should be understood that the above descriptions are meant to be taken only by way of example. Numerous variations, additions, omissions, and other modifications will be apparent to one of ordinary skill in the art, and such variations, additions, omissions, and other modifications should be considered within the scope of this disclosure. Thus, while example embodiments have been shown and described, it will be apparent to those skilled in the art that changes and modifications may be made therein without departing from the spirit and scope of this disclosure.

What is claimed is:

1. A computer-implemented method for detecting living-off-the-land binary (LOLBin) attacks, comprising:
    receiving a dataset of command line data sourced from one or more compute instances, wherein the dataset includes a plurality of command lines that execute one or more binary executable files;
    using a content-based logarithmic sampling algorithm that employs a locality sensitive hash to create a sampled dataset from the dataset, wherein the using the content-based logarithmic sampling algorithm comprises computing a hash of one or more command lines of the plurality of command lines in the dataset using the locality sensitive hash, assigning one or more command lines of the plurality of command lines to one or more clusters based on a corresponding command line's hash, and logarithmically sampling command lines from one or more of the clusters to create the sampled dataset;
    labeling the sampled dataset and featurizing the sampled dataset to produce a labeled featurized dataset;
    training a machine learning model of a threat management facility executing on one or more computing devices using the labeled featurized dataset; and
    deploying the trained machine learning model to detect LOLBin attacks on a compute instance.

2. A computer-implemented method for detecting living-off-the-land binary (LOLBin) attacks, comprising:
    receiving a dataset of command line data sourced from one or more compute instances, wherein the dataset includes a plurality of command lines that execute one or more binary executable files;
    using a content-based logarithmic sampling algorithm that employs a locality sensitive hash to create a sampled dataset from the dataset, wherein the using the content-based logarithmic sampling algorithm comprises computing a set of multiple values of one or more of the command lines of the plurality of command lines in the dataset using the locality sensitive hash, for each value, logarithmically sampling from one or more of the command lines having the value to create a respective value sample, and merging the value samples for each value to create the sampled dataset;
    labeling the sampled dataset and featurizing the sampled dataset to produce a labeled featurized dataset;
    training a machine learning model of a threat management facility executing on one or more computing devices using the labeled featurized dataset; and
    deploying the trained machine learning model to detect LOLBin attacks on a compute instance.

3. The computer-implemented method of claim 2, wherein the locality sensitive hash is a min-wise independent permutations locality sensitive hashing scheme (MinHash), and at least one value is a MinHash value.

4. The computer-implemented method of claim 1, further comprising:
    applying a pre-trained machine learning model to the sampled dataset to predict one or more pseudo-labels that indicate whether a given command line is a benign command line or malicious command line; and
    producing the labeled dataset from the sampled dataset and the pseudo-labels.

5. The computer-implemented method of claim 1, wherein the featurizing further comprises:
    extracting character-level features to produce the labeled featurized dataset.

6. The computer-implemented method of claim 1, wherein the machine learning model includes a convolutional neural network model having an embedding stage, a feature detection stage, and a classification stage, and
    training the machine learning model further comprises:
        predicting, by the convolutional neural network model, a probability a given command line is malicious; and
        evaluating performance by comparing the predicted probability the given command line is malicious against a label indicating whether the given command line is actually malicious and applying a binary cross-entropy loss function.

7. The computer-implemented method of claim 1, further comprising:
    collecting a prediction dataset of command line data for the compute instance, wherein the prediction dataset includes at least one command line that executes a binary executable file;
    featurizing the prediction dataset by converting the at least one command line to produce a featurized prediction dataset;
    using, by the threat management facility, the trained machine learning model to classify the featurized prediction dataset into benign command line data or malicious command line data;
    detecting, by the threat management facility, a LOLBin attack in response to a classification indicating the featurized prediction dataset includes malicious command line data; and
    performing a remedial action on the compute instance in response to the detected LOLBin attack.

8. The computer-implemented method of claim 7, further comprising:
    applying a set of rules to the prediction dataset to classify one or more of the command lines in the prediction dataset into a severity class; and
    prior to using the trained machine learning model, pre-filtering the prediction dataset based on severity class.

9. A system for detecting living-off-the-land binary (LOLBin) attacks, comprising:
    one or more computing devices that include one or more processors and one or more memories;
    one or more security agents adapted to be executed on a compute instance, the security agents configured to collect command line data that includes command lines that execute binary executable files; and
    a threat management facility adapted to be executed at least in part on the one or more computing devices, the threat management facility configured to:
        receive a dataset of command line data sourced from the one or more compute instances, wherein the dataset includes a plurality of command lines that execute binary executable files,
        use a locality sensitive hashing algorithm to create a sampled dataset from the dataset by computing a hash of one or more command lines of the plurality of command lines in the dataset, assigning one or more command lines of the plurality of command lines to one or more clusters based on a corresponding command line's hash, and logarithmically sampling command lines from one or more of the clusters to create the sampled dataset, label the sampled dataset and featurize the sampled dataset to produce a labeled featurized dataset, train a machine learning model using the labeled featurized dataset, and deploy the trained machine learning model to detect LOLBin attacks.

10. The system of claim 9, wherein the locality sensitive hashing algorithm is a min-wise independent permutations locality sensitive hashing scheme (MinHash) algorithm.

11. The system of claim 9, wherein the threat management facility is further configured to:

apply a pre-trained machine learning model to the sampled dataset to predict one or more pseudo-labels that indicate whether a given command line is a benign command line or malicious command line; and produce the labeled dataset from the sampled dataset and the pseudo-labels.

12. The system of claim 9, wherein the threat management facility is further configured to:

extract character-level features to produce the labeled featurized dataset.

13. The system of claim 9, wherein the machine learning model includes an embedding stage, a feature detection stage, and a classification stage, and the threat management facility is configured to train the machine learning model at least in part by:

predicting, using the convolutional neural network model, a probability a given command line is malicious; and evaluating performance by comparing the predicted probability the given command line is malicious against a label indicating whether the given command line is actually malicious and applying a binary cross-entropy loss function.

* * * * *